Feb. 16, 1943.  W. SCHMELZ  2,311,351
AUXILIARY AIR SUPPLIER FOR GAS ENGINES
Filed May 20, 1941

William Schmelz INVENTOR
BY Popp & Popp
ATTORNEYS

Patented Feb. 16, 1943

2,311,351

UNITED STATES PATENT OFFICE 2,311,351

AUXILIARY AIR SUPPLIER FOR GAS ENGINES

William Schmelz, Buffalo, N. Y.

Application May 20, 1941, Serial No. 394,336

1 Claim. (Cl. 137—153)

This invention relates to an auxiliary air supplier for gas engines whereby air in varying quantity is supplied to the fuel intake of the engine in addition to that which is usually mixed with the fuel in the carburetor to produce a combustible mixture.

It has been found that when an engine is running at relatively low speed that a rich mixture is required in which the proportion of gas or liquid fuel is relatively great compared with the amount of air used to produce a combustible mixture, but when the engine is running at a comparatively high speed a greater amount of air can be used in the combustible mixture and thus permit of operating the engine more economically.

One of the purposes of this invention is to provide simple and efficient means for supplying auxiliary air to the fuel conduit of the engine which are responsive to the variations in suction in the fuel conduit and operate to increase the amount of auxiliary air which is added to the fuel conduit when the engine is running at high speed and to reduce the amount of auxiliary air when the engine is running at lower speeds and thereby effect a considerable economy in the operation of the engine.

Another object of this invention is to supply such auxiliary air to the fuel conduit in such manner that no hissing noise is produced but instead this air is added in varying quantities in perfect silence.

A further object of this invention is to provide means for removing from the auxiliary air all solid matter entrained therein before this air reaches the fuel conduit and thus avoid undue wear of the parts with which this air comes in contact.

In the accompanying drawing.

In the following description similar characters of reference indicate like parts in the several figures of the drawing.

Figure 1:
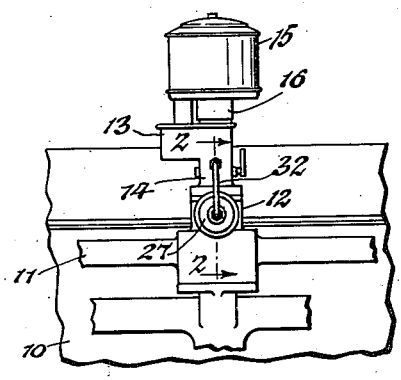
Fig. 1 is a fragmentary side elevation of a gas engine equipped with this invention.

Those parts of a gas engine shown in the drawing are only an example of a construction in connection with which the present invention can be advantageously employed which parts comprise the cylinder block 10 including the usual working cylinder and the mechanism associated therewith, a main fuel intake 11 having a fuel inlet 12 and communicating with the several cylinders and adapted to supply a mixture of gaseous fuel thereto, a carburetor 13 adapted to mix a fluid fuel and air and deliver the same through its outlet 14 as a combustible mixture to the inlet of said intake manifold, a filter 15 which is connected with the main air inlet 16 of the carburetor and whereby solid impurities are removed from the external air before the same enters the carburetor, a throttle valve 9 of butterfly form arranged in the carburetor outlet and mounted on a shaft 17 which is manually operable from the exterior in the usual and well-known manner.

Figure 4:
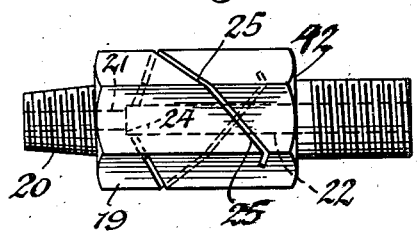
Fig. 4 is an external view of the body of the valve mechanism which controls the supply of auxiliary air to the fuel conduit.
Figure 3:
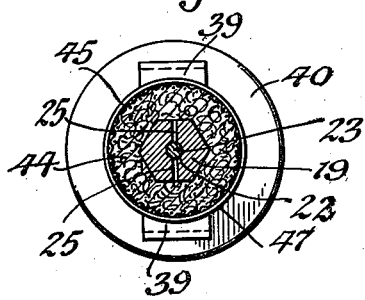
Fig. 3 is a cross section, taken on line 3—3, Fig. 2.

The inlet 12 of the fuel intake and the outlet 14 of the carburetor together form the upper and lower sections of a fuel conduit with which this invention is associated, the preferred construction of this invention being as follows:

The numeral 18 represents an auxiliary air inlet opening which is formed in the lower section of the fuel conduit below the throttle valve and through which auxiliary air is supplied to the fuel mixture in addition to the main air which is supplied to the fuel as it passes through the carburetor. The passage of auxiliary air through the opening 18 from the external atmosphere into the fuel conduit is controlled by an air inlet valve which includes a tubular body 19 having a nipple 20 at its front end which screws into the opening 18, a longitudinal bore formed in the body and consisting of a front section 21 of small diameter forming an air outlet which opens into the fuel conduit, a rear section 22 of larger diameter which forms a guide for a longitudinally movable auxiliary valve member 23, an internal shoulder 24 arranged between the inner and outer sections of the bore in the body and forming a stop adapted to be engaged by the front end of the valve member, and an auxiliary air inlet or port 25 extending from the large rear bore section in the body to the periphery of the latter. The air inlet port preferably is constructed in the form of two slots which are formed in opposite sides of the valve body 19 and each of which is arranged at an angle or helically relatively to the longitudinal axis of the valve body, as shown in Fig. 4.

The valve member is preferably of cylindrical form and when moved inwardly until its front end engages the stop 24 then the port slots 25 are closed and no auxiliary air can pass through the same to the fuel conduit 12, 14. Upon moving the valve member 23 outwardly its front end uncovers the port slots 25 and permits auxiliary air to pass through the same from the external atmosphere to the fuel conduit, thereby supplementing the main supply of air which is supplied to the fuel through the air filter 15 and the carburetor.

Figure 2:
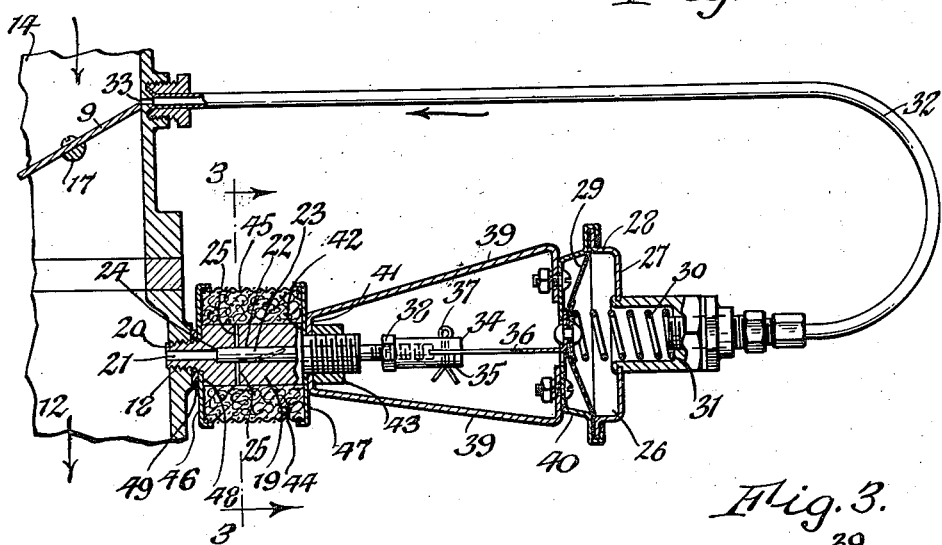
Fig. 2 is a longitudinal sectional elevation, on an enlarged scale, of that part of the engine embodying these improvements.

Opening of the auxiliary valve member is produced by the suction or vacuum which is created in the fuel conduit above the throttle valve by the exhausting effect of the engine pistons in the suction strokes of the same. This is preferably accomplished by means which are constructed as follows:

The numeral 26 represents a suction chamber having a rigid rear wall 27 and side wall 28 and a movable front wall 29 having the form of a flexible diaphragm. This diaphragm is operatively connected with the auxiliary valve member so as to move in unison therewith and the same is yieldingly moved forwardly for closing the movable valve member by spring means and pneumatically moved rearwardly for opening the auxiliary valve member by the vacuum in the fuel conduit. The spring means for closing the auxiliary valve member preferably comprise a helical spring 30 arranged within the suction chamber and bearing at its front end against the inner side of the diaphragm while its rear end bears against the bottom of a tubular neck 31 projecting rearwardly from the rear fixed wall of the suction chamber. The pneumatic opening of the auxiliary valve is effected by a suction tube 32 which has its inlet end connected with the rear end of the neck 31 and its outlet end connected with a suction opening 33 formed in the fuel conduit immediately above one wing of the butterfly throttle valve, as shown in Fig. 2.

The connection between the diaphragm and the auxiliary valve member is preferably made adjustable so that the extent of opening of the auxiliary air supply port 25 may be varied to suit different requirements during the operation of the engine. In its preferred form this adjustable connection consists of an adjusting sleeve 34 screwed on the rear end of the auxiliary air valve member and provided with a longitudinal slit 35, a flat valve stem or rod 36 having its front end arranged in the slit of the adjusting sleeve and its rear end connected with the central part of the diaphragm, a cotter pin 37 connecting said adjusting tube and valve stem, and a clamping screw nut 38 arranged on the rear end of the auxiliary valve and bearing against the adjusting tube, as shown in Fig. 2.

The suction chamber is held in a fixed position by a bracket consisting preferably of two longitudinal bars 39 arranged on opposite sides of the auxiliary valve member, adjusting sleeve and valve stem and connected at their rear ends with a flange 40 on the suction chamber, and a cross bar 41 connecting the front ends of the longitudinal bars 39 and clamped between a shoulder 42 on the rear part of the valve body 19 and a clamping screw nut 43 on this valve body.

Cleaning of the auxiliary air or removal of solid impurities therefrom before the same reaches the fuel supply conduit is preferably effected by a filtering body 44 of metallic wool surrounding the valve body 19 and covering the valve port slots 25, a cylindrical casing 45 of woven wire or similar material surrounding the filtering body, and front and rear cup-shaped heads 46, 47 engaging the front and rear ends of the filtering body and casing. The front head is removably mounted on the front end of the auxiliary valve body by clamping the same to a shoulder 48 thereon, a washer 49 being interposed between this head and the adjacent part of the fuel conduit, and the rear head 47 is removably mounted on the valve body 19 by clamping the same between the shoulder 42 on the latter and the cross bar 41 of the bracket.

When the engine is at rest and the throttle valve 9 is closed, the spring 30 pushes the diaphragm 29 inwardly until the inner end of the valve member 23 engages with the shoulder 24 whereby the slots 25 of the auxiliary air inlet port are completely closed, as shown in Fig. 2. Upon opening the throttle valve and starting the engine the upper wing of the throttle valve moves from a position below the suction opening 33 to a position above said opening, thereby causing the downwardly moving stream of combustible mixture or fluid fuel in the fuel conduit 14, 12 to produce an exhausting effect in the suction tube and suction chamber 26, whereby the diaphragm 29 is drawn outwardly. As a result of this movement of the diaphragm the valve member 23 is drawn outwardly so as to uncover the auxiliary air supply slots 25, thereby permitting the suction in the lower part of the fuel conduit to draw air from the external atmosphere through the auxiliary ports and the bore of the body 19 of the auxiliary air valve into the fuel conduit wherein the same becomes mixed with the downwardly moving stream of fluid fuel mixture so as to increase the air content of the same and improve its combustibility and power producing capacity.

When the engine is running at a comparatively low speed the suction on the pipe 32 and chamber 26 is moderate so that the valve member 23 is only moved partway of its full outward stroke, thereby causing the same to only uncover the inner end portions of the air slots 25 and permitting only a comparatively small amount of auxiliary air to enter the fuel conduit which is sufficient for running the engine economically at low speed.

When, however, the speed of the engine is increased the suction effect on the pipe 32 and chamber 26 is increased, thereby causing the diaphragm to be drawn outwardly farther and the valve member 23 to uncover the air slots 25 a greater extent so that more air can pass through the same and mix with the fuel stream in the fuel conduit for further increasing the power output for a given amount of fuel.

By these means the amount of auxiliary air which is supplied to the main fuel stream is automatically regulated in accordance with the variations in the speed of the engine and causes the quantity of air in the combustible mixture to be varied as best suits the requirements for the particular speed at which the engine is running.

Due to the angularity of the slots 25 the same impart a spiral twist or turn to the stream of auxiliary air passing inwardly through the same, thereby avoiding the creation of any noise or whistling action of this air and causing the same to be added to the fuel stream without any unpleasant reaction.

In addition to removing any solid matter from the auxiliary air before it enters the main fuel stream the filtering body 44 which covers the outer ends of the auxiliary air slots 25, also aids in rendering the passage of this air into the fuel conduit noiseless.

The position of the throttle valve 9 relative to the suction port 33 and the position of the auxiliary valve member 23 relative to the air inlet slots 25 is such that when the engine is idling or running at comparatively low speed, the throttle valve 9 will be opened only slightly but sufficient to supply the necessary fuel from the carburetor to keep the engine running and at this time the auxiliary air valve member 23 although somewhat pulled away from the shoulder 24 is still covering the air inlet slots 25 completely so that no air is permitted to pass from the exterior through these air slots to the lower part 12 of the fuel conduit.

When, however the throttle valve 9 is opened to a greater or considerable extent the suction through the opening 33, pipe 32 and chamber 26 is substantially increased and causes the auxiliary air valve member 23 to be pulled outwardly to such extent that the area of the air slots 25 is uncovered to a corresponding greater extent and permits an amount of auxiliary air to enter the fuel conduit proportional to the increase in the speed of the engine.

I claim as my invention:

An auxiliary air supplier comprising a valve body having an air outlet in one of its ends, a cylindrical valve seat arranged in the opposite end of the body and connecting with said outlet, and an air inlet arranged in the side of said body and leading from said valve seat to the exterior of the body and extending at an angle to the axis of said valve seat, a cylindrical valve member slidable lengthwise in said valve seat and adapted to cover and uncover more or less of said angular air inlet, and means for operating said valve member which include a suction chamber having a movable wall, and means for transmitting motion from said wall to said valve member including an adjusting sleeve having a screw connection with said valve member and provided with a longitudinal slot, a shifting rod connected at one end with said wall and arranged at its opposite end in said slot, a pin extending transversely through said sleeve and rod, and a clamping screw nut arranged on said valve member and engaging said adjusting sleeve.

WILLIAM SCHMELZ.